United States Patent
Eggebraaten et al.

(10) Patent No.: US 8,275,779 B2
(45) Date of Patent: *Sep. 25, 2012

(54) DATA TRANFORMATIONS FOR APPLICATIONS SUPPORTING DIFFERENT DATA FORMATS

(75) Inventors: Thomas J. Eggebraaten, Rochester, MN (US); Jeffrey W. Tenner, Rochester, MN (US); Shannon E. Wenzel, Colby, WI (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/357,814

(22) Filed: Jan. 22, 2009

(65) Prior Publication Data

US 2010/0185696 A1 Jul. 22, 2010

(51) Int. Cl.
*G06F 17/30* (2006.01)
*G06F 7/00* (2006.01)

(52) U.S. Cl. ........................ 707/756; 707/803
(58) Field of Classification Search ............. 707/756, 707/803
See application file for complete search history.

(56) References Cited

U.S. PATENT DOCUMENTS

| 6,675,354 | B1 | 1/2004 | Claussen et al. |
| 7,065,706 | B1 | 6/2006 | Sankar |
| 7,073,120 | B2 * | 7/2006 | Torii et al. ............ 715/239 |
| 7,222,334 | B2 * | 5/2007 | Casati et al. .......... 717/136 |
| 7,328,403 | B2 | 2/2008 | Ramarao et al. |
| 7,426,750 | B2 * | 9/2008 | Cooper et al. .......... 726/26 |
| 7,925,971 | B2 | 4/2011 | Funnekotter et al. |
| 2003/0084078 | A1 | 5/2003 | Torii et al. |
| 2004/0034830 | A1 | 2/2004 | Fuchs et al. |
| 2008/0022107 | A1 * | 1/2008 | Pickles et al. ......... 713/176 |
| 2008/0222517 | A1 | 9/2008 | Halim et al. |
| 2010/0185634 | A1 * | 7/2010 | Eggebraaten et al. ..... 707/756 |
| 2010/0185696 | A1 | 7/2010 | Eggebraaten et al. |

OTHER PUBLICATIONS

U.S. Patent Application entitled "Data Tranformations for a Source Application and Multiple Target Applications Supporting Different Data Formats" by Thomas J. Eggebraaten et al., U.S. Appl. No. 12/357,859, filed Jan. 22, 2009.

U.S. Patent Applidation entitled "Data Tranformations Between a Source Application and Service-Oriented Target Applications Supporting Different Data Formats" by Thomas J. Eggebraaten et al., U.S. Appl. No. 12/357,902, filed Jan. 22, 2009.

* cited by examiner

*Primary Examiner* — Sathyanarayan Pannala
(74) *Attorney, Agent, or Firm* — Patterson & Sheridan LLP (57) ABSTRACT

Embodiments of the invention allow structured data to be transferred between a source application and a target application that process structured data in different formats. For example, structured data may have a set of associated rules which transform the structured data based on a set of variables. The source application may register variable definitions for each of the variables in a registry. The target application may read the registry and register values for each of the rule variables. Once values are registered for the variables, the source application may transfer the structured data to a transformation engine that applies the rules, using the registered values for the variables, to transform the structured data into a format compatible with the target application. In doing so, the transformation engine can generate a document in any format compatible with the target application and subsequently transfer the generated document to the target application.

21 Claims, 9 Drawing Sheets

| SOURCE APPLICATION | VARIABLE NAME | VARIABLE TYPE | VARIABLE ID |
|---|---|---|---|
| APPLICATION X | VERSION | CHAR | 1 |
| APPLICATION X | CCSID | INT | 2 |

202

| SOURCE APPLICATION | TARGET APPLICATION | VARIABLE ID | VARIABLE VALUE |
|---|---|---|---|
| APPLICATION X | APPLICATION M | 1 | 1.0 |
| APPLICATION X | APPLICATION M | 2 | 37 |
| APPLICATION X | APPLICATION N | 1 | 1.0 |
| APPLICATION X | APPLICATION N | 2 | 37 |
| APPLICATION X | APPLICATION O | 1 | 2.0 |
| APPLICATION X | APPLICATION O | 2 | 284 |

504

| SOURCE APPLICATOR | RETURN HANDLER |
|---|---|
| APPLICATION X | FILENAME1 |

DATA TRANFORMATIONS FOR APPLICATIONS SUPPORTING DIFFERENT DATA FORMATS

BACKGROUND OF THE INVENTION

1. Field of the Invention

Embodiments of the invention generally relate to data processing, and more particularly, to transforming structured data from a format used by a source application into a format compatible with a target application.

2. Description of the Related Art

Given the complexity of computing systems, different applications running on a system frequently use different data formats. Accordingly, it is necessary to provide techniques of transforming data from one data format to another.

One approach for data transformation is for a source application to perform a handshake exchange of capabilities with a target application to determine what capabilities (or data formats) the target application has (or can accommodate). Based on these capabilities, the source application modifies or constructs its content prior to sending to the target application. This approach has a limitation in an architecture where a single document is routed to various target applications. In this case, valuable resources are consumed as the handshake exchange of capabilities is performed between the source application and each target application.

SUMMARY OF THE INVENTION

One embodiment of the invention provides a computer-implemented method for transforming structured document data received from a source application for use by a target application. The method generally includes receiving, from the source application, one or more variable definitions, wherein each variable definition defines a variable used to determine how to transform the structured document data, based on a specified value for each of the one or more variable definitions, receiving, from the target application, a registered value for each of the one or more variable definitions, receiving, from the source application, the structured document data, wherein the structured document data includes one or more embedded processing rules used to transform the structured document data, based on a value for each of the one or more variable definitions, identifying the registered value for each of the one or more variable definitions, applying the embedded processing rules to the structured document data, based on the registered variable definitions, to transform the structured document data to be compatible with the target application, and transmitting the transformed structured document data to the target application.

Another embodiment of the invention provides a computer-readable storage medium containing a program which, when executed, performs an operation for transforming structured document data received from a source application for use by a target application. The operation generally includes receiving, from the source application, one or more variable definitions, wherein each variable definition defines a variable used to determine how to transform the structured document data, receiving, from the target application, a registered value for each of the one or more variable definitions, receiving, from the source application, the structured document data, wherein the structured document data includes one or more embedded processing rules used to transform the structured document data, based on a value for each of the one or more variable definitions, identifying the registered value for each of the one or more variable definitions, applying the embedded processing rules to the structured document data, based on the registered variable definitions, to transform the structured document data to be compatible with the target application, and transmitting the transformed structured document data to the target application.

Yet another embodiment of the invention provides a system. The system generally includes a processor and a memory containing a program, which, when executed by the processor, is configured to transform structured document data received from a source application for use by a target application by performing an operation. The operation generally includes receiving, from the source application, one or more variable definitions, wherein each variable definition defines a variable used to determine how to transform the structured document data, receiving, from the source application, the structured document data, wherein the structured document data includes one or more embedded processing rules used to transform the structured document data, based on a value for each of the one or more variable definitions, identifying the registered value for each of the one or more variable definitions, applying the embedded processing rules to the structured document data, based on the registered variable definitions, to transform the structured document data to be compatible with the target application, and transmitting the transformed structured document data to the target application.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention allow structured data to be transferred between a source application and a target application that process structured data in different formats. For example, the structured data may include a set of rules used to transform the structured data based on a set of variables. The source application may register variable definitions for each of the variables in a registry. The target application may read the registry and register values for each of the rule variables. Once values are registered for the variables, the source application may transfer the structured data to a transformation engine that applies the rules. In turn, the transformation engine transforms the structured data into a format compatible with the target application, using the registered values for the variables. In doing so, the transformation engine can generate a document in a format compatible with the target application and subsequently transfer the generated document to the target application.

When transferring structured data between a source application and a plurality of target applications that process structured data in different formats, each target application may register values for variable definitions registered by the source application. In such a case, the transformation engine may identify what distinct sets of variable values are registered for the plurality of target applications and transform structured data accordingly. In doing so, the number of transformed documents generated is limited to the number of distinct sets of variable values, thereby avoiding duplicate transformed documents from being generated.

When transferring structured data between a source application and service-oriented target applications that process structured data in different formats, the structured data may be divided into different sections, where each section is processed by a respective service of the target application. In this case, each service of the target application may register values for each of the variables definitions registered by the source application. In doing so, the transformation engine may transform each section of the structured data and subsequently transfer the transformed sections of the structured data to respective services of the target application for processing.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
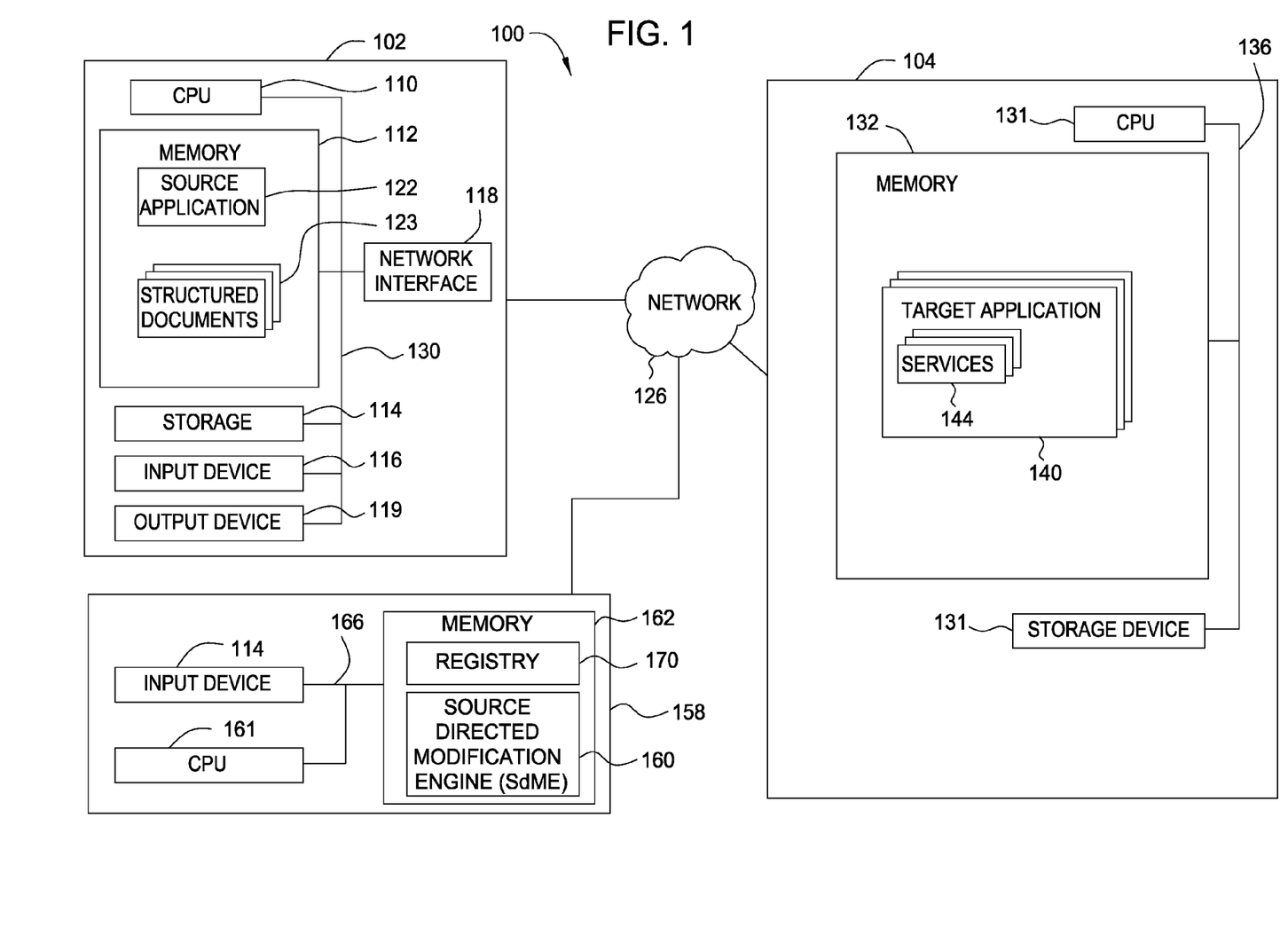
FIG. 1 illustrates a block diagram of a networked computer system, according to one embodiment of the invention.

FIG. 1 illustrates a block diagram of a computing system 100. In general, the system 100 includes a client (e.g., user's) computer 102 and at least one server 104. The client computer 102 and the server computer 104 are connected via a network 126. In general, the network 126 may be a local area network (LAN) or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any display screen such as a CRT or LCD monitor. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may allow network communications between the client computer 102 and the server 104 via the network 126. For example, the network interface device 118 may be a network adapter or other network interface card (NIC). Storage 114 stores application programs and data. Examples of storage 114 include one or more hard-disk drives, flash memory devices, optical media and the like. Memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Memory 112 is also shown containing a source application 122 that, when executed on CPU 110, provides support for navigating between various servers 104 and locating network addresses at one or more of the servers 104. In one embodiment, the source application 122 includes a web-based Graphical User Interface (GUI), which allows the user to display HyperText Markup Language (HTML) and/or Extensible Markup Language (XML) documents. More generally, the source application 122 may be any program (preferably GUI-based) capable of rendering the information transmitted to the client computer 102 from the server 104. For some embodiments, the source application 122 may enable a user to conduct database transactions (e.g., build and issue queries) with the server 104, for example, via one or more GUI screens that form a query building interface. In other words, queries issued by the client 102 may be sent to the server 104 over the network 126 (and results from the query will be sent from the server 104 to the client 102).

The server computer 104 may be physically arranged in a manner similar to the client computer 102. Accordingly, the server computer 104 is shown generally including a CPU 131, a memory 132, and a storage device 134, coupled to one another by a bus 136. Memory 132 may be a random access memory sufficiently large to hold the necessary programming and data structures that are located on the server 104. Of course, one of ordinary skill in the art will recognize that FIG. 1 is merely one hardware/software configuration for the networked client computer 102 and server 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML and XML, embodiments of the invention are not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown.

In one embodiment, the source application 122 running on the client computer 102 and the target applications 140 running on the server 104 may be executed on different computing platforms (e.g. a different hardware architecture, operating system, programming language, graphical user interface, a different version of software, etc.). Frequently, data gathered by the source application 122 (for example, via user input) and subsequently transferred to one (or more) of the target applications 140 (e.g. as structured documents 123) may be in a format that is incompatible with a format required by the target application 140. Therefore, in one embodiment, before the particular target application 140 processes a structured document 123 received from the client computer 102, the structured document 123 may be transformed into a format compatible with the target applications 140. Further, in one embodiment, target applications 140 may include a plurality of sub-components (referred to as services 144). In some cases, a source application 122 may use multiple services 144 provided by a target application 140 to process a structured document 123. In such a case each service 144 may be configured to process a different section of the structured document 123. In such cases, a structured document 123 may be divided into different portions, where each portion is transferred to a service 144 that operates on that portion. Services 144 are further discussed below in conjunction with FIGS. 7-9.

In one embodiment, structured document 123 may be transformed according to a set of predefined rules. Further, the predefined rules may be embedded in the structured document 123. For example, suppose the structured document 123 is an Extensible Markup Language (XML) document. In such a case, the rules for transforming the structured data may be supplied in an XML stylesheet included with the XML document. In one embodiment, the rules defined in the XML stylesheet specify how a given set of structured data elements in one format may be transformed into another format. For example, the rules may be used to specify how to transform a structured document 123 into another markup language, add or remove data elements from the XML document, and the like. Further, as described in greater detail below, the transformation may be done using Extensible Stylesheet Language Transformations (XSLT).

As shown, the registry server 158 is connected to the client computer 102 and the server computer 104 via the network 126. The registry server 158 may be physically arranged in a manner similar to the client computer 102 and the server computer 104. Accordingly, the registry server 158 is shown generally comprising a CPU 161, a memory 162, and a storage device 164, coupled to one another by a bus 166. Memory 162 may be a random access memory sufficiently large to hold the necessary programming and data structures that are located on the registry server 158.

As shown, memory 162 includes a registry 170. As described in greater detail below, the registry 170 may provide a directory or table that is accessible by both the source application 122 and the target application 140. For example, both the source application 122 and the target application 140 may be configured to access variable definitions (and values associated therewith) stored in the registry 170. In one embodiment, the registry server 158 allows source application 122 to define one or more variables which the source application 122 uses within rules embedded in a given structured document 123 to control how that structured document 123 should be modified by a Source-directed Modification Engine (SdME) 160. The source application 122 registers such variable definitions with the registry 170. Given the variables registered by a given source application 122 in the registry 170, one of the applications 140 may specify a value for the variable required by a given target application 140. In operation, the source application 122 sends a structured document 123 with embedded modification rules to the SdME 160. The SdME 160 modifies the structured document (creating a new document) given the rules from that document, the variable definitions registered by the source application 122 and values for those variables registered by the target application 140. The resulting structured document generated by the SdME 160 may then be passed the target application 140.

The memory 162 includes the Source-directed Modification Engine (SdME) 160. As stated, the SdME 160 may apply the rules specified in a structured document 123 to transform document elements (i.e., registered variables) in that structured document 123 from the format supplied by the source application 122 to a format required by the target application(s) 140. That is, using the rules, the structured document 123 may be transformed into a format compatible with the target applications 140. In one embodiment, the source application 122 may transfer a structured document 123 to the SdME 160 for transformation, along with an indication of the intended target application 140. Once the SdME 160 receives the structured document 123, the SdME 160 may determine the registered values of the variables, and subsequently apply the rules based on those values to transform the structured document 123. For instance, if the rules are specified in an XML stylesheet, the SdME 160 may parse the stylesheet for the rules, and subsequently apply the values obtained from the registry 170 to the rules. Once the SdME 160 transforms the structured document 123, the SdME transfers the document to the target application 140. Operations performed by the SdME 160 are further described below in FIG. 4.

Also as shown, the memory 162 includes a return handler 172. In one embodiment, the return handler 172 is used to transform structured data returned from the target applications 140 into a format compatible with the source application 122. The return handler 172 is described in further detail in FIGS. 5 and 6.

As mentioned earlier, the structured data transferred to the target application 140 may be an Extensible Markup Language (XML) document. In such a case, the data in the XML document may conform to a Document Type Definition (DTD) used by the target application 140. The DTD may define the structure of the XML document, for example by specifying a list of allowed elements or tags of the XML document.

In one embodiment, the target applications 140 may use the DTD to verify that the data received from the source application 122 is valid (according to the DTD). For example, suppose the source application 122 is a web interface for entering (and receiving) medical information for patients, and further suppose the DTD specifies that a valid structured document 123 may include the following set of information:

Patient first name,
Patient last name,
doctor name, and
identification number.

When the source application 122 sends a structured document 123 which contains a set of patient information (via the XML document) to one of the target applications 140, that target application 140 may compare the received information to the DTD. If the information conforms to the DTD, the target applications 140 consider the structured document as valid.

However, in some cases, the source application 122 may support a set of patient information that is not specified by the DTD. That is, the source application may support documents which include structured data elements that are not supported by the target application 140. For example, suppose the source application 122 supports a new version of the document which allows a user to enter a middle name of a patient. In this case, when the patient information (including the middle name of the patient) is sent to the target applications 140, the information may not conform to the DTD (i.e. the DTD only supports a first name and last name). As a result, the target applications 140 may reject the information or report an error to the user.

In one embodiment, the SdME 160 may transform the information from the source application 122 to a format compatible with the target application 140. For example, the SdME 160 may transform the information using structured markup provided by the source application e.g., an XML stylesheet embedded in an XML document. As stated earlier, the rules that are applied for the transformation may be based on the values registered for the variables in the registry 170. Continuing with the example of structured markup of patient information, the source application 122 may register a variable definition with the registry specifying that the source application 122 may provide a structured document according to either a version 1 (where the <name> element may include sub elements of <first name> and <last name>) or a version 2 (where the <name> element may also include a <middle name> element). In turn, the target application 140 may register a value with the registry 170 indicating that the target application 140 supports only the version 1 form of such a document. In such a case, an embedded rule in a structured document 123 may specify how to transform a given document according to whether a version 1 format or a version 2 format is required. In such a case, the SdME 160 may evaluate a structured document supplied by the source application 122 and transform <name> elements as specified by the rule, in the present example, effectively stripping out any <middle name> elements in a structured document 123 supplied by the source application 122.

Figure 2:
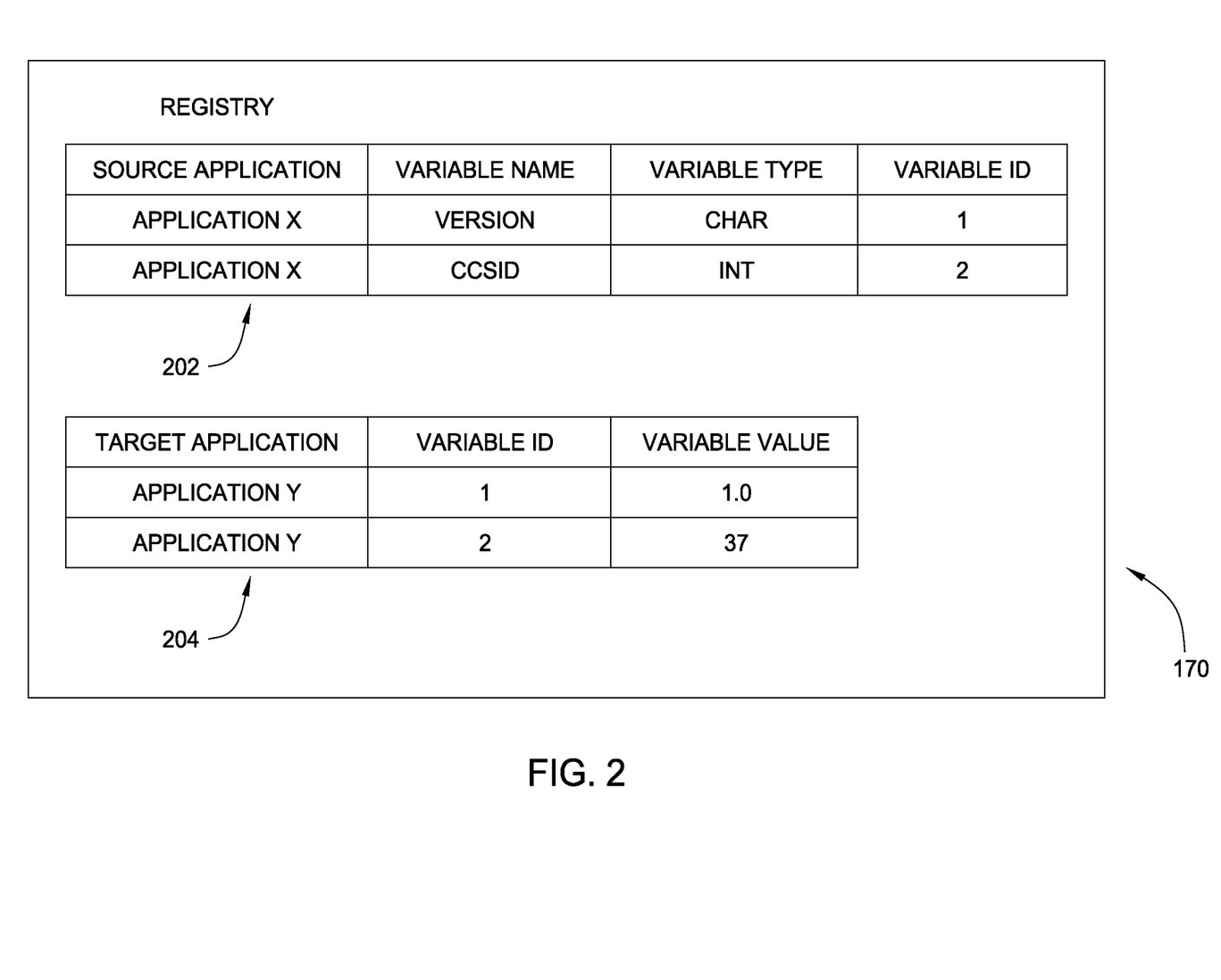
FIG. 2 illustrates an example of a registry, according to one embodiment of the invention.

FIG. 2 illustrates a registry 170, according to one embodiment of the invention. As stated, the registry 170 allows a source application 122 to register variable definitions. As shown, the registry 170 comprises two registry tables 202, 204. Registry table 202 comprises variable definitions as provided by the source application ("Application X") 122. In one embodiment, each variable definition may be defined by the following elements: the name of the source application 122 using the variable, the name of the variable, the variable type, and a variable identification number (ID). Accordingly, registry table 202 is shown with four column headers, "Source Application," "Variable Name," "Variable Type," and "Variable ID." As shown, the source application 122 has updated the registry 170 with two variables: "Version" and "CCSID (Coded Character Set Identifier)." By registering the registry table 202 with the two variables, the source application 122 indicates that the structured document 123 is transformable based on these two variables.

Further, as shown in the registry table 204, the source application 122 has registered the names of the target application ("Application Y") 140 which receive the structured document 123. The target applications 140 evaluate the variable definitions registered by the source application 122 and registers values for the variable definitions. The values registered by the target application 140 represent what format/versions/content, etc., of a structured document 123 are supported by the target applications 140.

As shown, registry table 204 includes the values registered by the target applications 140 for each of the variables. Accordingly, registry table 204 is shown with three column headers, "Target Application," "Variable ID," and "Variable Value." The "Target Application" column represents the name of the target application 140, as specified by the source application 122, which may specify a value for a particular variable. The "Variable ID" column maps to the "Variable ID" column of registry table 202. Accordingly, Variable ID "1" represents the "Version" variable, and Variable ID "2" represents the "CCSID" variable. Finally, the "Variable Value" contains the values for each of the variables, as specified by the target applications 140. As shown, "Application Y" specifies a value of "1.0" for Variable ID 1 ("Version") and also specifies a value of "37" for Variable ID 2 ("CCSID").

By registering a value of "1.0" for the "Version," the target applications 140 indicates that it supports version "1.0" of the structured document 123. Returning to the example where the source application 122 is a web interface for entering medical information for patients, recall that version "1.0" supports data associated with a first name and a last name of a patient, and version "2.0" of the structured document 123 supports data associated with the first name, the last name, and the middle name of a patient. Further suppose the source application 122 supports version "2.0", while the target application 140 supports version "1.0" of the structured document 123. In this case, if the source application 122 transfers a structured document 123 containing the first name, last name, and middle name of a patient to the target application 140, a mismatch would occur between the data received and the DTD of the target applications 140. Therefore, the "2.0" structured document 123 may be transformed into "1.0" structured document 123 so that the target applications 140 only receive the first name and the last name of a patient. Because the target applications 140 have indicated that they support version "1.0" of the structured document 123 (by registering a value of "1.0" for the "Version"), the SdME 160 can transform the document accordingly by applying the value ("1.0") of the specified version to the embedded rules in the structured document provided by the source application 122.

Another example is provided with respect to the "CCSID" variable. In general, the CCSID represents a coded character set used for an application. The character set used by the application is identifiable by the value of the CCSID. For example, those having ordinary skill in the art would realize that a CCSID decimal value of 37 represents an English character set, while a decimal value of 284 represents the a Spanish character set. As shown in registry table 204, the target "Application Y" specifies that it supports the English character set ("37"). Accordingly, when the source application 122 transfers the data to the target applications 140, the SdME 160 transforms the data, or more specifically, converts the characters of the source application 122 into the English character set ("37").

While FIG. 2 illustrates variables "Version" and "CCSID," these variables are in no way meant to be limiting of the invention, and are used simply in an exemplary manner. Further, while FIG. 2 illustrates a single target application 140 registering values for variable definitions (i.e. parameters used to specify how a given document should be modified for a given target application 140), additional target applications 140 may also register values for the variable definitions. Thus, each target application 140 may have an associated set of variable definitions. For example, each target application 140 may register a respective value for the "Version" and "CCSID" variables. Therefore, in one embodiment, a transformation may occur for each instance of a target application 140. For example, if the structured document 123 being transformed is an XML document, a transformed XML document may be generated for each of the target applications 140 and subsequently transferred to each of the target applications 140.

Figure 3:
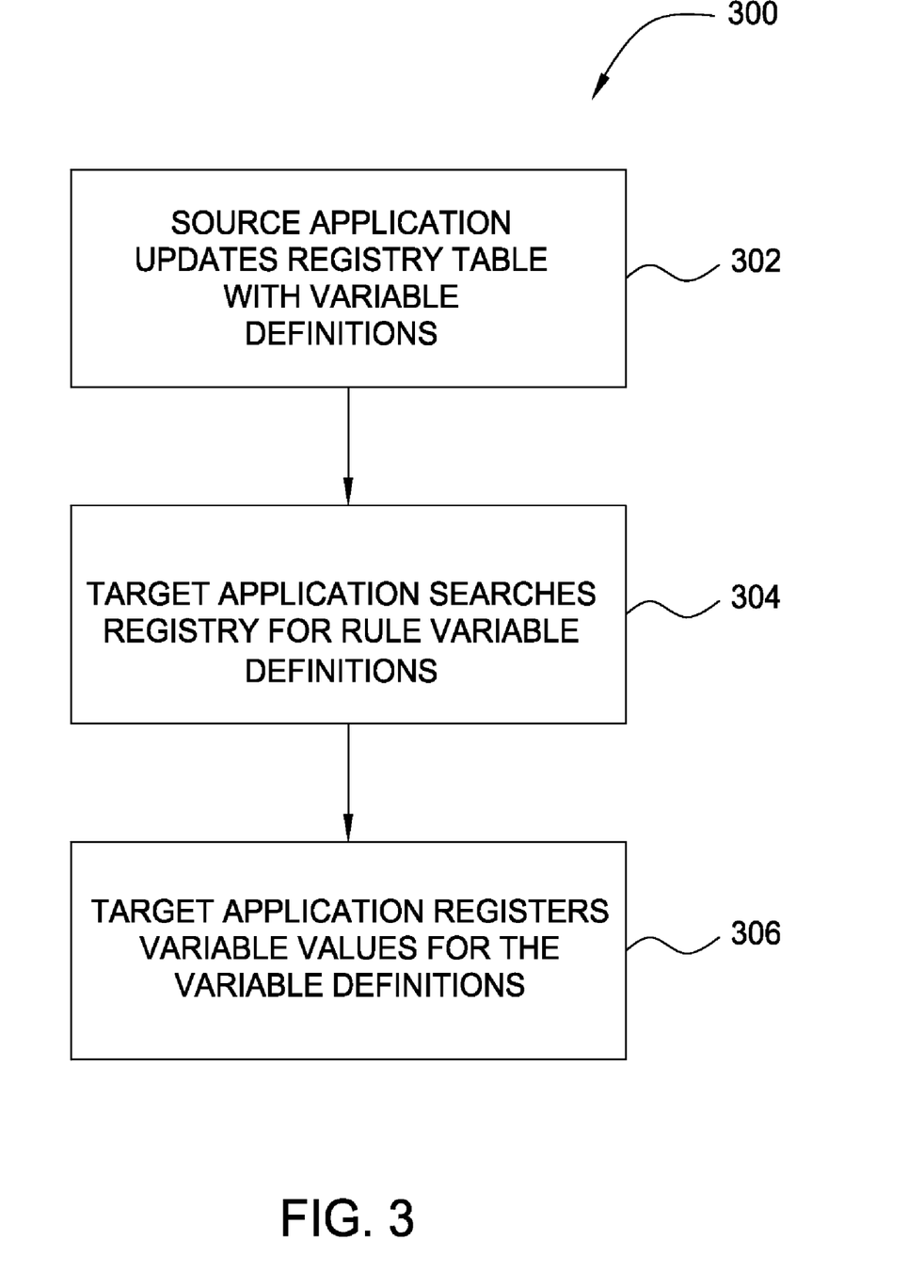
FIG. 3 is a flowchart illustrating a method for registering variable definitions and registering values for the variable definitions in a registry, to one embodiment of the invention.

FIG. 3 is a flowchart illustrating a method for registering variable definitions and registering values for the variable definitions in a registry, according to one embodiment of the invention. As shown, the method 300 begins at step 302, where the source application 122 registers variable definitions with a registry 170, e.g., registry table 202 of FIG. 2. For example, the source application 122 may create a row in the registry table 202 for each variable definition. In one embodiment, each variable definition includes the name of the source application 122, a name for the variable, a variable type for the variable (i.e., char, int, float, string, and the like), and a unique variable ID.

At step 304, a target application 140 may search the registry 170 to determine which variable definitions exist (and are recognized by the target application 140). Once the variable definitions have been determined, at step 306, the target application 140 may register values for each recognized variable definition. For example, the target application 140 may register values in registry 170 using a table like table 204 shown in FIG. 2. In one embodiment, such a registry table may include the name of the target application 140, a variable ID which maps to the variable definition defined by the source application 122, and a value for the variable as registered by the target application 140.

Figure 4:
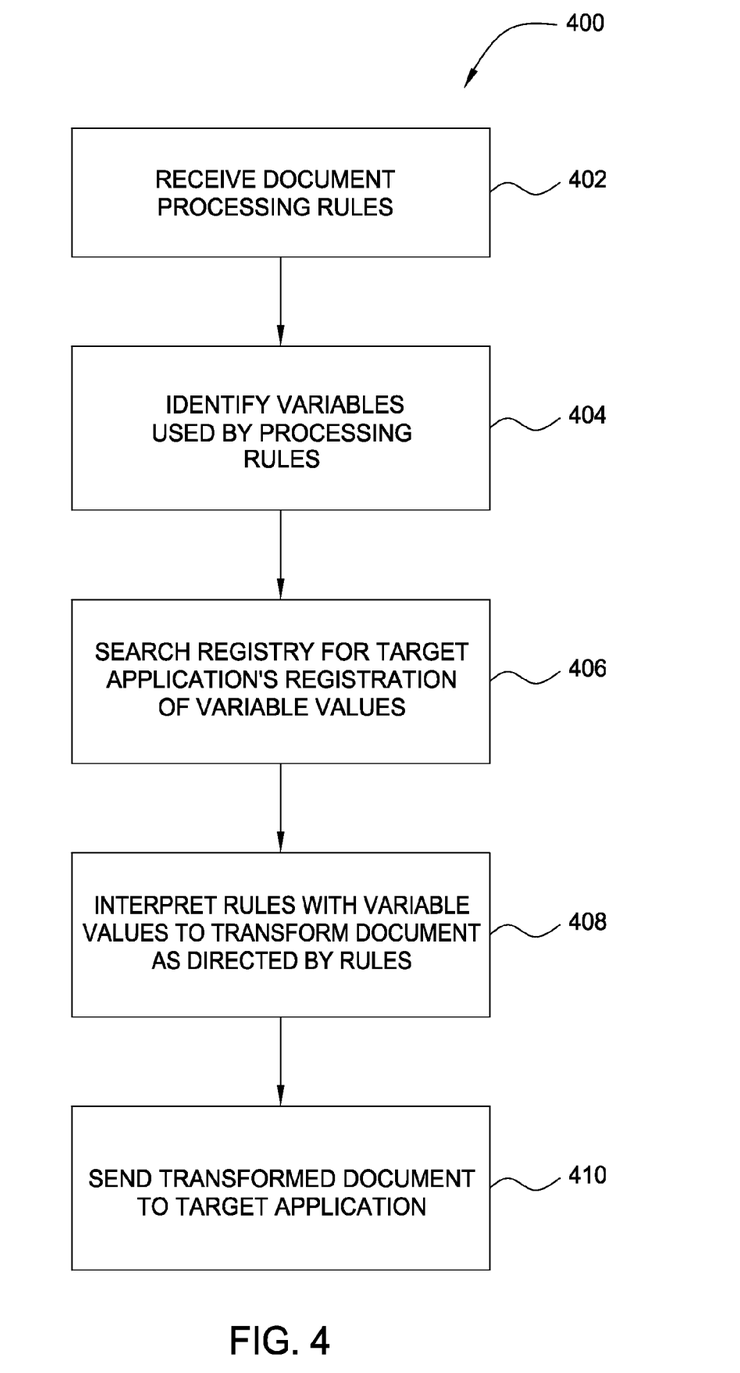
FIG. 4 is a flowchart illustrating a method for transforming a structured document, according to one embodiment of the invention.

After the target application 140 registers values for the variable definitions, the SdME 160 may transform a structured document 123 based on the values for the variables and transformation rules embedded in a given document. For example, FIG. 4 illustrates a method 400 for transforming a structured document 123, according to one embodiment of the invention. As shown, the method 400 begins at step 402, where the source application 122 transfers data to the SdME 160 for transformation. Further, the source application 122 may also pass the name of the source application 122 and the name of an indentured target application (or applications) 140 which are to receive the structured document 123.

As stated, the structured document 123 may contain embedded processing rules used to transform that document based on the variable values registered with the registry by the target application 140. That is, the embedded rules may specify how the document should be modified based on the set of variables registered (in registry table 202) for the target applications 140. At step 404, the SdME 160 identifies the variables that the rules use. At step 406, the SdME 160 searches the registry 170 for variable values registered by the target applications 140. Using the rules defined by the source application 122 and the variable values registered by the target applications 140, at step 408, the SdME 160 may apply them to generate a transformed document. In doing so, the data within the transformed document may be in a format compatible with the target applications 140. Once the transformed document is generated, at step 410, the SdME 160 transfers the transformed document to the target applications 140, where the target applications 140 process the transformed document.

In one embodiment, the SdME 160 may transfer a transformed document to multiple target applications 140. In some cases, the target applications 140 may register the same variable values for a respective instance of variable definitions. That is, each target application 140 may support the same data format(s). In one embodiment, the SdME 160 may create a transformed document for each of the target applications 140, regardless of how the target applications 140 specify the variable values of the variable definitions.

Alternatively, the SdME 160 may create a transformed document for every distinct set of variable values registered by the target applications 140. In this case, if more than one target application 140 registers the same variable values for the variable definitions, then a single transformed document is generated for those target applications 140. Once the single transformed document is generated, the same document may be sent to those target applications. By limiting how many transformed documents are created to the number of distinct sets of variable values, the SdME 160 may avoid creating duplicate transformed documents.

Figure 5:
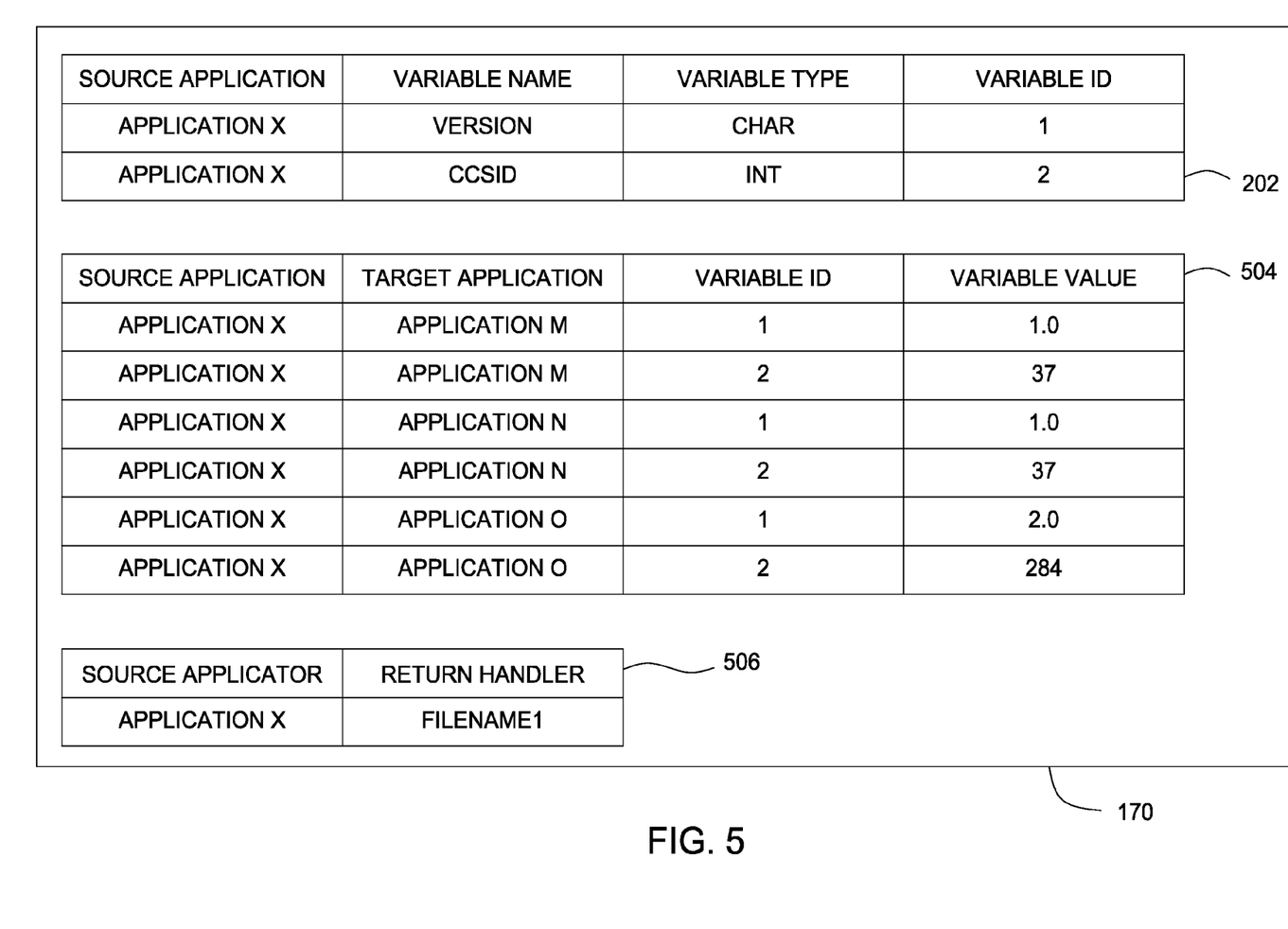
FIG. 5 illustrates another example of a registry, according to one embodiment of the invention.

FIG. 5 illustrates an example of a registry with distinct sets of variable values specified by multiple target applications 140, according to one embodiment of the invention. Specifically, FIG. 5 illustrates a registry 170 having three registry tables 202, 504, 506. Registry table 202 has already been described above in FIG. 2.

Registry table 504 contains the same column headers as illustrated in registry table 202 of FIG. 2. However, as shown, table 504 illustrates a table where multiple target applications have registered values for the variable definitions of Variable ID "1" ("Version") and Variable ID "2" ("CCSID"). As shown, each target application ("Application M," "Application N," "Application O") 140 has its own instance of variable values for the source application 122 it supports. For example, "Application M" and "Application N" both register a value of "1.0" for Variable ID "1" and both register a value of "37" for Variable ID "2." "Application O" registers a value of "2.0" for Variable ID "1" and registers a value of "284" for Variable ID "2."

As such, "Application M" and "Application N" have registered the same variable values for Variable ID's "1" and "2." Therefore, "Application M" and "Application N" share a distinct set of registry variable values. "Application O," on the other hand, has registered variable values that differ from the values registered by "Application M" and "Application N." Therefore, "Application O" has its own distinct set of registry variable values. As such, FIG. 5 illustrates two distinct sets of registry variable values.

In one embodiment, target applications 140 may return structured data or a structured document 123 to the source application 122 (in response to the structured document 123 received from the source application 122). Similar to transferring a structured document 123 from the source application 122 to one of the target applications 140, the structured data returned from that target application 140 may be in a format not compatible with the source application 122. In one embodiment, the source application 122 may specify rules which the SdME 160 can use to transform the data returned from the target applications 140 into a format understood by the source application 122 using the return handler 172.

As shown, FIG. 5 includes a registry table 506 which specifies a return handler 172. In one embodiment, the return handler may be a file which specifies a set of rules and associated variables which transforms structured data returned by a target application 140 to a format required by the with the source application 122. Accordingly, the return handler 172 is specified by a file name ("filename1"). In one embodiment, the structured data returned from the target applications 140 may be an XML document or style sheet supplied to the SdME 160 along with a response document from a target application 140. That is, when a target application 140 returns structured data, the SdME 160 may apply the rules specified in the return handler 172 to transform the returned structured data to a format requested by the source application 122.

Figure 6:
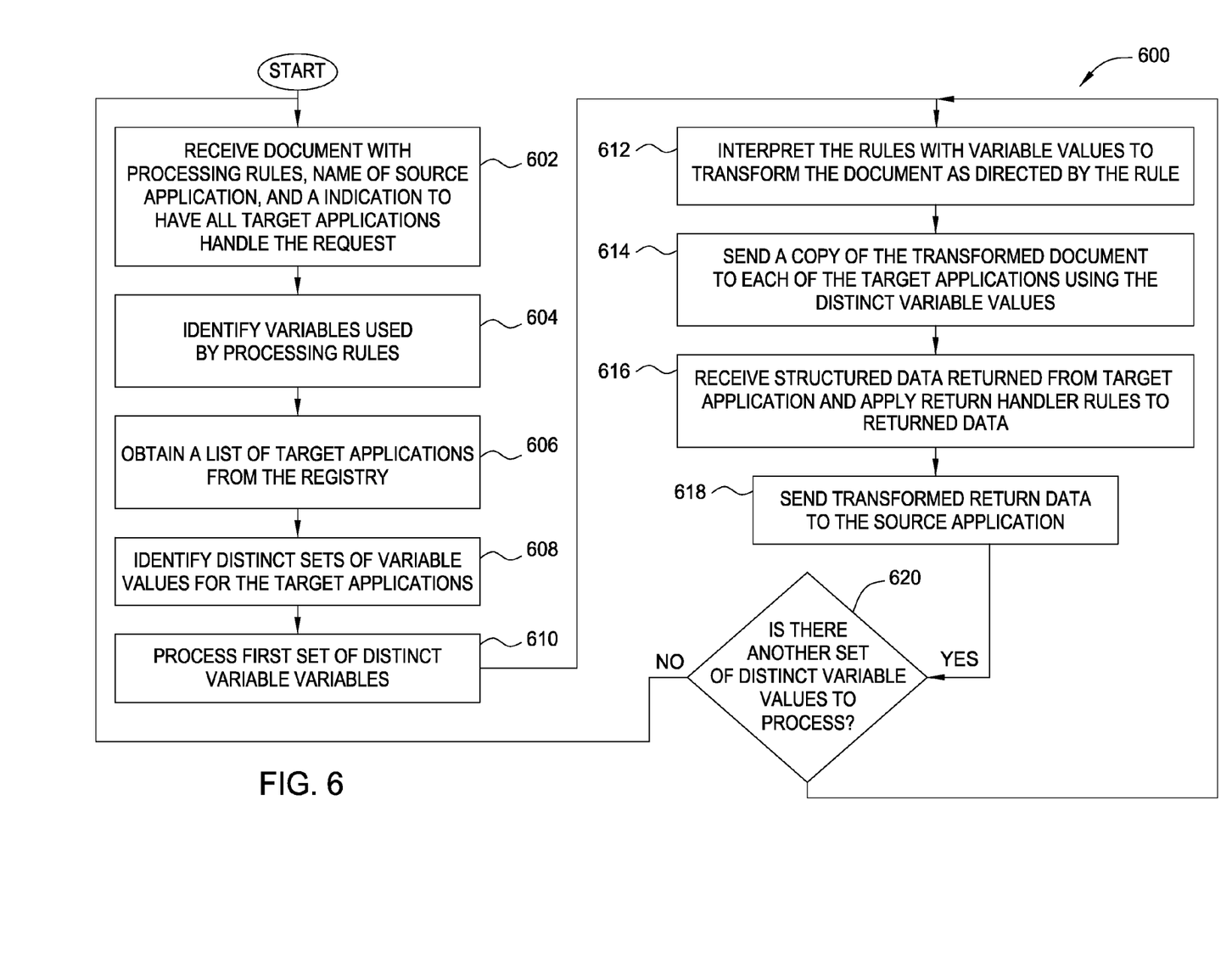
FIG. 6 is a flowchart illustrating a method for transforming data for multiple target applications, according to one embodiment of the invention.

FIG. 6 illustrates a method 600 for transforming data for multiple target applications 140, according to one embodiment of the invention. As shown, the method 600 begins at step 602, where the source application 122 transfers data to the SdME 160 for transformation. Further, in one embodiment, the source application 122 may also provide the name of the source application 122 and an indication to have all (or a set of specific) registered target applications 140 process the structured data, thereby eliminating the need for the source application 122 to register the name of each and every target application 140 that is to receive the data.

At step 604, the SdME 160 identifies the variables used by the processing rules embedded in the particular structured document 123. At step 606, the SdME 160 may search the registry 170 and generate a list of target applications 140 registered to process a structured document 123 from the source application 122. In the illustration shown in FIG. 5, for example, "Application M," "Application N," and "Application O" each receive data from source application "Application X." Therefore, all three applications may be placed in the list.

At step 608, the SdME 160 may identify distinct sets of variable values for all the target applications 140 specified in the list obtained in step 606. Using the data from the tables of FIG. 5, two distinct sets may be obtained. For example, "Application M" and "Application N" have the same variable values. Therefore, "Application M" and "Application N" have registered a common set of variable values. "Application O," on the other hand, have values that differ from "Application M" and "Application N." Accordingly, the values registered by "Application O" represent a distinct set of variable values. Thus, two distinct sets of variable values are shown in the tables of FIG. 5.

At step 610, a first distinct set of variable values is processed to create a transformed XML document. When processing the first distinct set of variable values, the SdME 160 may apply the rules embedded in the structured document 123 (step 612). In doing so, the structured document 123 may be transformed into a format compatible with the target applications (e.g. "Application M" and "Application N") 140.

At step 614, each target application 140 using the first distinct set of variable values receives the transformed document. Once this set of target applications 140 receives the transformed document, this set of target applications 140 each process the respective document, and further, may return a structured document intended for the source application 122. In one embodiment, the structured document returned by a given target application 140 may be transferred to the SdME 160. In such a case, at step 616, the SdME 160 may apply rules specified in a return handler (e.g., the return handler indicated in registry table 506 of FIG. 5) to transform the structured document into a format appropriate for the source application 122. At step 618, once the structured document has been transformed, that document may be transferred to the source application 122, where the source application 122 processes the returned data.

At step 620, the SdME 160 may determine if there is another set of distinct variable values. If so, the method returns to 612, where the SdME 160 transforms the structured document 123 into a format compatible with the target applications 140 using the different set of distinct variable values (e.g. "Application O"). On the other hand, if it is determined that there are no more sets of distinct variable values, then the method returns to 602, where the next structured document 123 (if any) to be transferred to the target applications 140 is processed.

Service-Oriented Applications

In one embodiment, one (or more) of the target applications 140 may include a plurality of sub-components. For example, each sub-component may provide a service 144 that performs a specific business or technical task. In some cases, a source application 122 may use multiple services 144 provided by a target application 140 to process a structured document 123. In such a case, each service 144 may be configured to processes a section of a structured document 123 supplied by the source application 122. Accordingly, in one embodiment, a structured document 123 may be divided into different portions, where each portion is transferred to a service 144 that operations on that portion.

Further, the particular set of services 144 provided a target application 140 may not all have the same constraints (e.g., one service may support both "version 1" and "version 2" of a given document, where another service supports only "version 1"). Therefore, in one embodiment, portions of a structured document 123 that are transferred to the different services 144 may be transformed to a format compatible with each of the services 144.

Figure 7:
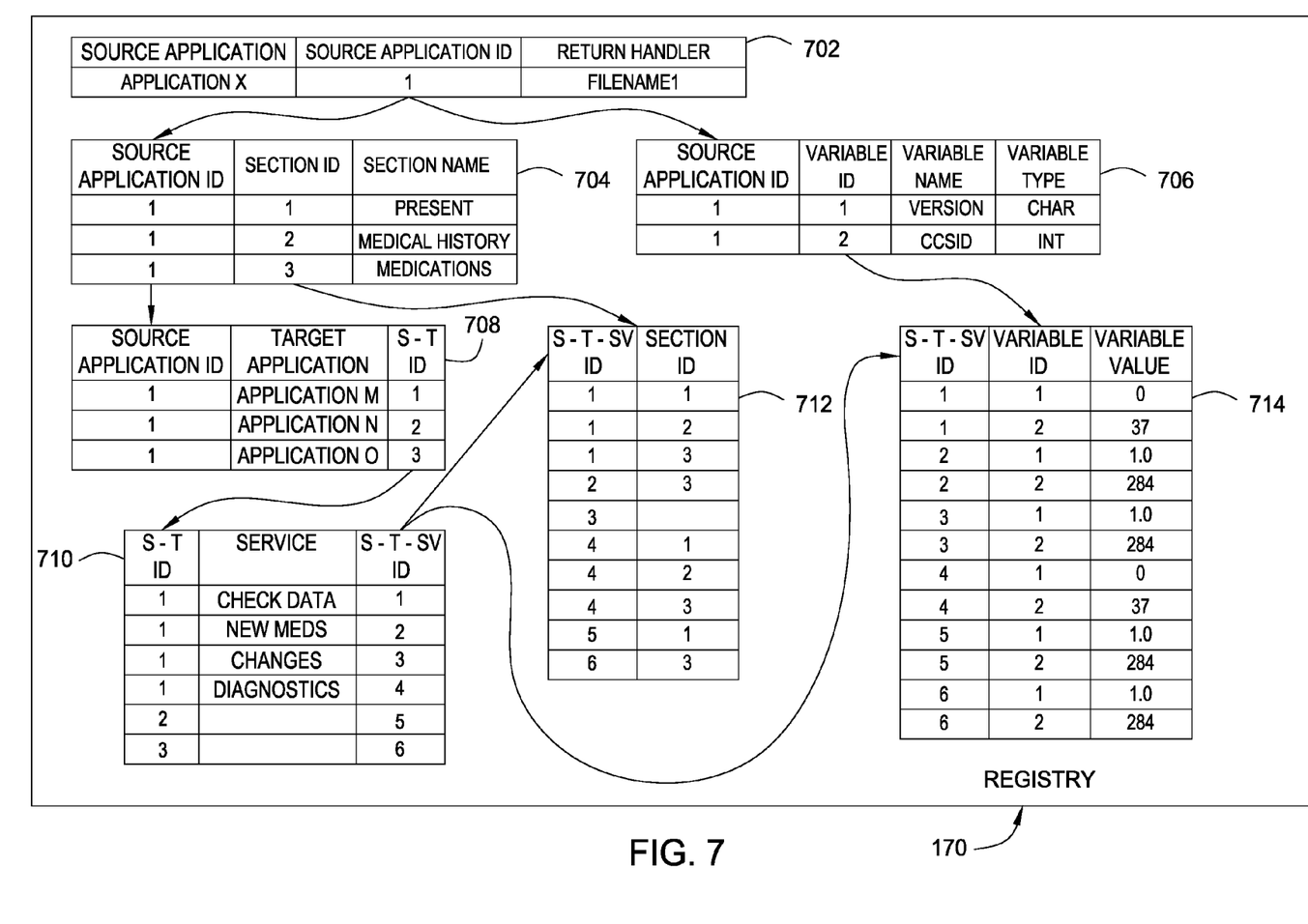
FIG. 7 illustrates a registry, according to another embodiment of the invention.

To support data transformation for service-oriented applications, the registry 170 may include registration information for sections of a structured document 123, and also include registration information regarding the services 144 provided by target applications 140. For Example, FIG. 7 illustrates a registry 170 which specifies document sections and target application services 144 along with the variable definitions previously described in FIG. 2, according to one embodiment of the invention. As shown, the registry 170 includes a plurality of registry tables 702, 704, 706, 708, 710, 712, 714.

Tables 702, 704, 706 include information that is registered by a source application 122, while tables 708, 710, 712, 714 include information that is registered by target applications 140. Registry table 702 indicates the source applications 122 running in the system 100. As shown, registry table 702 has been registered with the name of the Source Application ("Application X"), a Source Application ID ("1"), and an associated return handler ("filename1"). The Source Application ID may be used to reference the source applications 122 via other registry tables (discussed below). In one embodiment, the return hander may provide rules for transforming data returned from target applications 140 to a format compatible with the source application 122. In another embodiment, in cases where services 144 of a target application 140 are used to process a document, the return handler may also provide rules that merge together the structured data returned from each of the services 144.

Registry table 704 indicates the different sections of a document to be processed, as specified by the source application(s) 122. As shown, registry table 704 includes the following three columns: Source Application ID, a Section ID and a Section Name. Registry table 704 references the source application(s) specified in registry table 702 via the values registered in the Source Application ID column. The Section ID column provides unique ID numbers for each of the section names registered in the Section Name column. The Section ID may be used to reference the section names via other registry tables (discussed below). The Section Name provides the name for each section of the structured document 123 to be processed. As an illustrative example, each section may contain information regarding medical information for patients. As shown, the document to be processed contains the following three sections regarding patient information: "Present," "Medical History," and "Medications." The "Present" section may contain information on the present condition for which the patient is being seen, the "Medical History" section may contain a patient's medical history, and the "Medications" section may contain the names of medications currently taken by a patient.

Registry table 706 indicates the variable definitions for the source applications 122 registered in registry table 702. In one embodiment, variable definitions may be registered for the entire document. In another embodiment, variable definitions may be registered per section of the document. As shown, the registry table 706 includes the following four columns: Source Application ID, Variable ID, Variable Name and Variable Type. Registry table 706 references the source application(s) specified in registry table 702 via the values registered in the Source Application ID column. The Variable ID column provides a unique ID number for each of the variable names registered in the Variable Name column. The Variable ID may be used to reference the section names via other registry tables (discussed below). As shown two variable names have been registered, "Version," and "CCSID." The Variable Type column specifies the variable type for each of the variable names registered (i.e. "char" and "nt").

Registry table 708 indicates the target applications 140 running in the system 100. As shown, registry table 708 has the following three columns: Source Application ID, Target Application, and a source-target (S-T) ID. Registry table 708 references the source application(s) specified in registry table 702 via the values registered in the Source Application ID column. The Target Application column specifies the target applications 140 associated with the source application(s) 120. As shown, the Target Application column has been registered with the name of the following target applications: "Application M", Application N," and "Application O". The S-T ID column specifies unique ID numbers for each of source-target pair specified in the fourth registry table 708. The S-T ID may be used to reference the source-target pairs via other registry tables (discussed below).

Registry table 710 indicates the services 144 provided by each of the target applications registered in registry table 708. As shown, registry table 708 has the following three columns: S-T ID, Service, and a source-target-service (S-T-SV) ID. Registry table 710 references the source-target pair(s) registered in registry table 708 via the values registered in the S-T ID column. Thus, an S-T ID of "1" references the source-target pair of "Application X" and "Application M," an S-T ID of "2" references the source-target pair of "Application X" and "Application N," and an S-T-ID of "3" references the source-target pair of "Application X" and "Application O."

The Service column specifies the services 144 provided by the target applications 140 and used by each of the source-target pairs. For example, "Application M" provides the following four services that are used between the source-target pair "Application X" and "Application M": "CheckData," "NewMeds," "Charges," and "Diagnostics." Further, it is illustrated that no services are provided by "Application N" and "Application O."

The S-T-SV ID column specifies unique ID numbers for each of the services 144 registered for each source-target pair. The S-T-SV ID may be used to reference each of the services 144 used by each source-target pair via other registry tables (discussed below). Further, it is illustrated that an S-T-SV ID is also provided for source-target pairs not utilizing any services 144 (e.g. S-T-SV ID "5" and "6").

Registry table 712 indicates the section of a document to be processed by each of the services 144 of each of the source-target pairs. As shown, registry table 712 has the following two columns: S-T-SV ID and Section ID. Registry table 712 references the services 144 used for each of the source-target pair(s) specified in registry table 710 via the values registered in the S-T-SV ID column. Thus, S-T-SV ID's of "1," "2," "3," and "4" reference the "CheckData," "NewMeds," "Charges," and "Diagnostic" services respectively for the source-target pair of "Application X" and "Application M." S-T-SV ID's of "5" and "6" reference the services 144 for the remaining source-target pairs. As stated earlier, no services have been specified for the remaining source-target pairs (as shown in registry table 710).

The Section ID column references the section IDs specified in the second registry table 706. As such, the Section ID column indicates the section name to be processed by a respective service 144 of a particular source-target pair. As shown, the "CheckData" and "Diagnostics" services of "Application M" (an S-T-SV ID of "1" and "4", respectively) process all three sections ("Present," Medical History," and "Medications," as illustrated in registry table 704) of the structured document 123. The "NewMeds" service of "Application M" (an S-T-SV ID of "2") processes only the "Medications" section. The "Charges" service of "Application M" (an S-T-SV ID of "3") does not process any section of the structured document 123 (as indicated by an empty field under the Section ID column). As further shown, "Application N" (an S-T-SV ID of "5"), which does not provide any services, processes the "Present" section of the structured document 123, while "Application O" (an S-T-SV of "6"), which also does not provide any services, processes the "Medications" section of the structured document 123.

Registry table 714 indicates variable values for each of the variable definitions registered in registry table 706. In one embodiment, variable values may be registered by each of the services 144 provided by each of the source-target pairs. As shown, registry table 714 has the following three columns: S-T-SV ID, Variable ID, and Variable Value. Registry table 714 references the services 144 used between each of the source-target pair(s) specified in the fifth registry table 710 via the values registered in the S-T-SV ID column. As shown, each of the services 144 used between each source-target pair has associated variable IDs, as indicated in the Variable ID column. The values specified in the Variable ID column reference the variable IDs specified in registry table 706. Thus, each service 144 of a source-target pair can register a value for associated variable definitions.

As shown, the values registered by each service 144 are provided in the Variable Value column of the seventh registry table 714. For example, the "CheckData" service of "Application M" (an S-T-SV ID of "1") registers a value of "0" for the "Version" variable and registers a value of "37" for the CCSID variable. The "NewMeds" service of "Application M" (an S-T-SV ID of "2") registers a value of "1.0" for the "Version" variable and registers a value of "284" for the CCSID variable. The "Charges" service of "Application M" (an S-T-SV ID of "3") registers a value of "1.0" for the "Version" variable and registers a value of "284" for the CCSID variable. The "Diagnostics" service of "Application M" (an S-T-SV ID of "4") registers a value of "0" for the "Version" variable and registers a value of "37" for the CCSID variable. As further shown, both "Application N" and "Application O" (an S-T-SV ID of "5" and "6," respectively), which do not provide any services, register a value of "1.0" for the "Version" variable and register a value of "284" for the CCSID variable.

Providing a registry 170 that includes the information provided in the registry tables 702, 704, 706, 708, 710, 712, 714 described above may be used to transfer a structured document 123 (e.g., an XML document) between applications and/or service-oriented applications having incompatible data formats. For example, in one embodiment, an XML document sent from a source application 122 may be transformed into a format compatible to a target application 140 before the target application 140 processes the document (by transferring the structured document 123 to the SdME 160 for transformation). In another embodiment, where an XML document is divided into different portions and sent to different services 144 of a target application 140, portions of a structured document 123 that are transferred to the different services 144 may be transformed to a format compatible with each of the services 144 (by transferring the structured document 123 to the SdME 160 for transformation).

Figure 8:
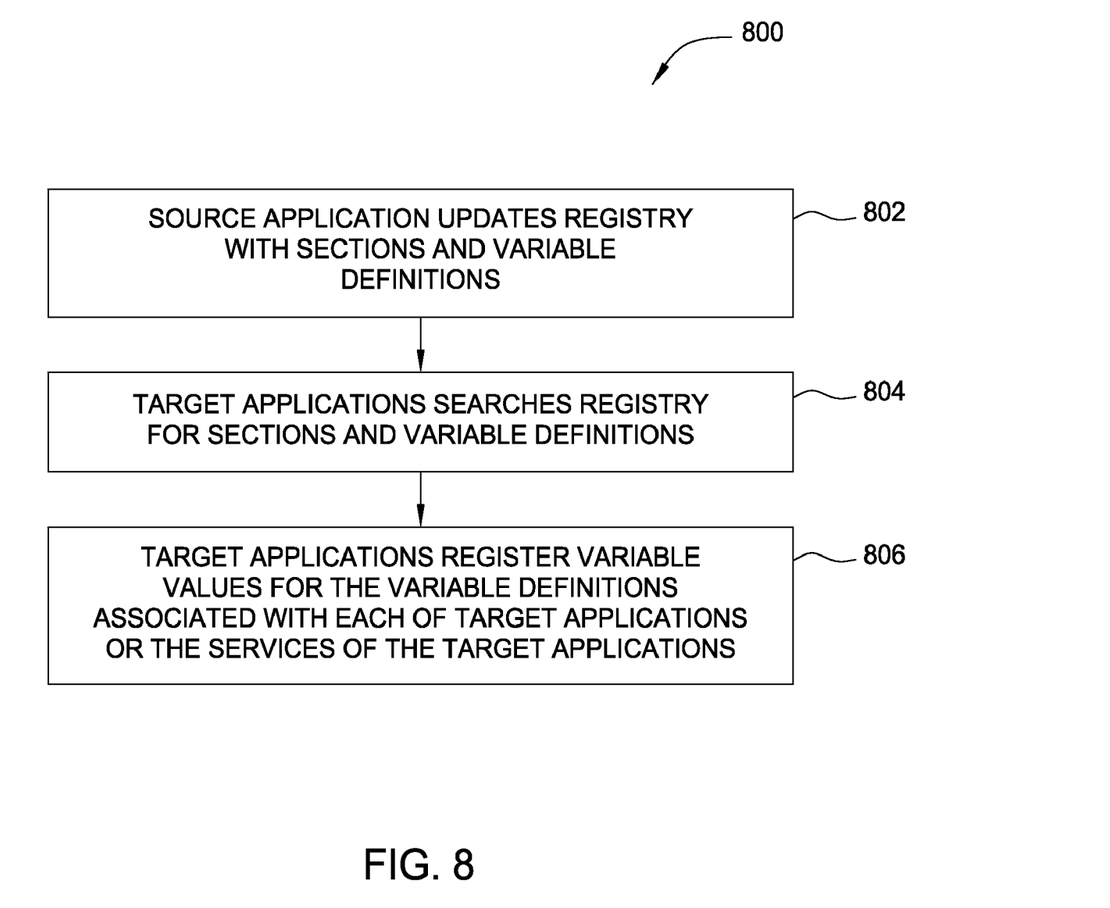
FIG. 8 is a flowchart illustrating another method for registering variable definitions and registering values for the variable definitions in a registry, according to one embodiment of the invention.

FIG. 8 is a flowchart illustrating a method for registering variable definitions and registering values for the variable definitions in a registry 170, according to one embodiment of the invention. As shown, the method 800 begins at step 802, where the source application 122 updates registry table 702, registry table 704, registry table 706. For example, a source application 122 may register a source application name, an associated source application ID, and, optionally, an associated return handler. This information is shown in FIG. 7 stored in registry table 702. Illustratively, registry table 704 includes registration information registered to specify variables applicable to different sections of a structured document 123. Registry table 706 may be used to store variable definitions registered by a given source application 122. In one embodiment, a variable definition may include a name of the source application, a name of the variable, a variable type for the variable (i.e. char, int, float, string, and the like), and a unique variable ID.

At step 804, one of the target applications 140 may examine the registry 170 to determine which variable definitions exist and which sections of a structured document 123 have been registered by the source application 122. Once determined, at step 806, each of the target applications 140 may update registry table 708, registry table 710, registry table 712, and registry table 714. For example, a target application 140 may supply a name of the target application associated with the source application stored in registry table 708. Similarly, registry table 710 may store a set of services 144 provided by a given target application 140, and registry table 712 may store values indicating which sections are to be processed by a respective target application 140 (or a respective service 144 of a target application 140). Registry table 712 may store values for the variable definitions for each of the target applications 140 or services 144 of the target applications 140. Once the values are registered for the variable definitions, the source application 122 may transfer a structured document 123 to the SdME 160 to begin the transformation process for the structured document 123.

Figure 9:
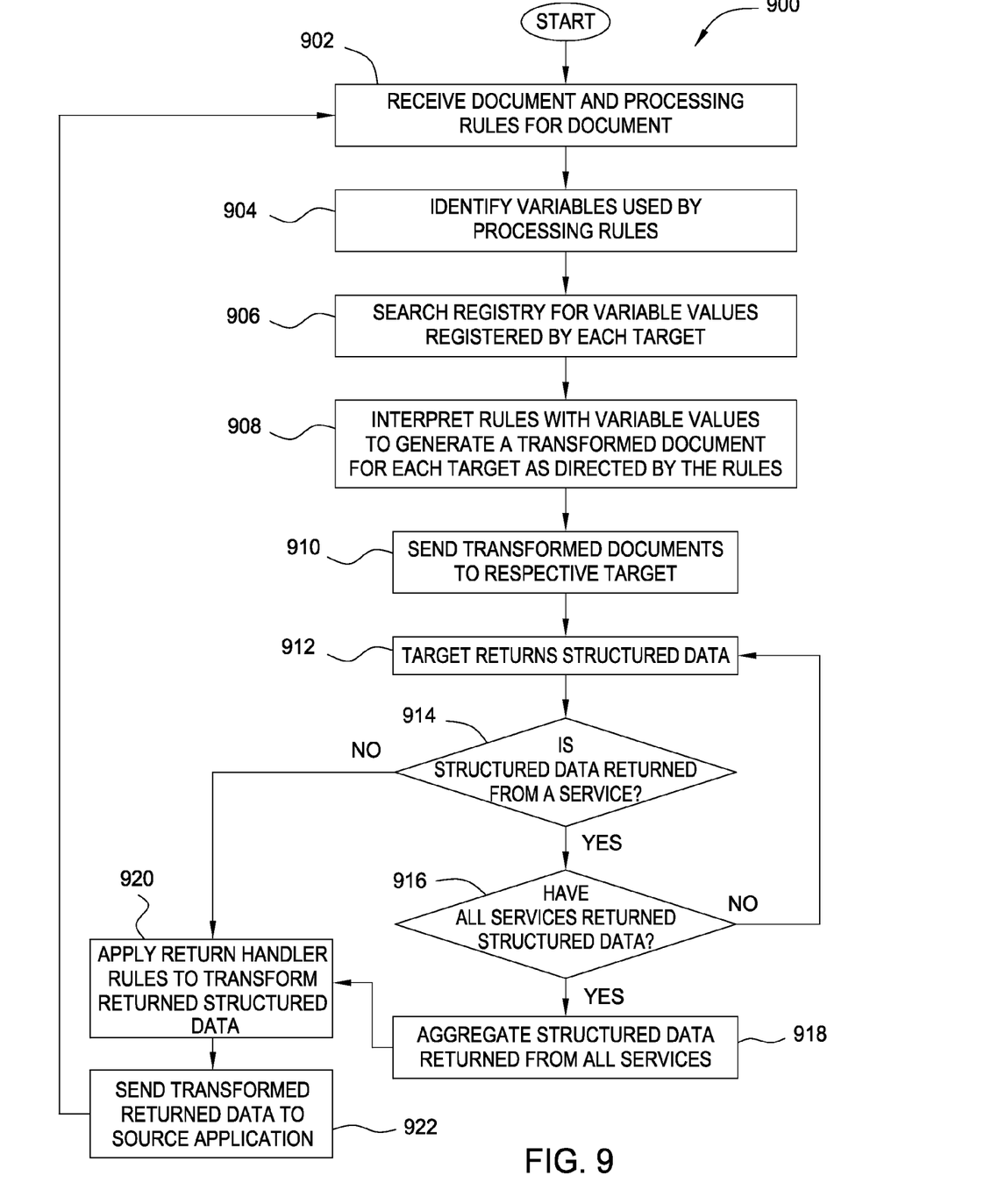
FIG. 9 is a flowchart illustrating a method for transforming data between a source application and a service-oriented application, according to one embodiment of the invention.

FIG. 9 illustrates a method 900 for transforming a structured document 123 transferred between a source application 122 and a service-oriented target application 140, according to one embodiment of the invention. As shown, the method beings at step 902, where the SdME 160 receives a structured document 123 having a plurality of sections. In one embodiment, the structured document 123 may contain embedded processing rules which determine how the structured document 123 is transformed, based on a specified target application 140 (or set of services 144). The rules may specify how the structured document 123 should be modified based on the set of variables registered in the registry table 714.

A step 904, the SdME identifies the variable definitions that the rules use. At step 906, the SdME 160 may search the registry 170 for variable values for the variable definitions identified in step 904. As shown in FIG. 8 (specifically, registry table 714), variable values may be registered by each target that is to receive a transformed document. For example, each service 144 of a target application 140 may have an associated set of variable values. As also shown in FIG. 8, target applications 140 not having any services 144 may also have an associated set of variable values.

At step 908, the SdME 160 may apply rules embedded in the structured document 123 (using the values for the variable definitions registered by the intended target application 140 (or services 144) to generate a transformed structured document 123 for each of the respective targets (i.e. each of the services 144 of the target applications 140 or target applications 140 not having any services). In doing so, each section of the structured document 123 that is processed by a respective target may be in a format compatible with that target. Further, in one embodiment, rather than generate a transformed document for each target, the SdME 160 may generate transformed structured documents 123 for each distinct set of variable values as illustrated in the method of FIG. 6. Once the transformations are complete, at step 910, the SdME 160 may transfer the transformed structured documents 123 to their respective targets, where each target processes the received transformed structured document 123.

In one embodiment, once a target application 140 (or service 144) processes a transformed structured document 123, a response structured document may be returned to the source application 122 (step 912). In some cases, however, the structured data returned may not be in a format appropriate for the source application 122. Further, in cases where a plurality of services 144 are processing portions of the structured document 123, each service 144 may have varying processing times. Therefore, the data returned from each of the services 144 may be received at different times. In this case, the data returned from a plurality of services 144 may be aggregated before the data is transferred to the source application 122.

In one embodiment, to transform the returned structured data to a format compatible with the source application 122 and also aggregate the structured data returned from a plurality of services 144, the returned data may first be transferred to the SdME 160. Accordingly, once the SdME 160 receives the structured data from a target, the SdME 160 may determine if the structured data returned is from either a service 144 of a target application 140 or a target application 140 not having any services at step 914. If it is determined that the data received is from a service 144 of a target application 140, the SdME 160 may determine if all the services 144 processing the document have returned structured data at step 916. If the SdME 160 determines that other services 144 need to return structured data, the method returns to step 912, where the SdME 160 receives structured return data from another target. However, if the SdME 160 determines that all the services 144 have returned structured data, at step 918, the SdME 160 aggregates all the structured data returned from the services 144.

Once all the returned structured data is received (either from the services 144 from a target application 140 or from a target application 140 having no services 144), the SdME may apply the rules specified by the return handler 172 to transform the returned structured data into a format compatible with the source application 122 at step 922. At step 924, once the returned structured data has been transformed, the data may be transferred to the source application 122, where the source application 122 processes the returned structured data. The method then returns to step 902, where the next document (if any) to be processed by the target applications 140 is processed.

Advantageously, as described herein, embodiments of the invention allow structured data to be transferred between a source application and a target application that process structured data in different formats. For example, structured data may have a set of associated rules which transform the structured data based on a set of variables. The source application may register variable definitions for each of the variables in a registry. The target application may read the registry and register values for each of the rule variables. Once values are registered for the variables, the source application may transfer the structured data to a transformation engine that applies the rules, using the registered values for the variables, to transform the structured data into a format compatible with the target application. In doing so, the transformation engine can generate a document in any format compatible with the target application and subsequently transfer the generated document to the target application.

When transferring structured data between a source application and a plurality of target applications that process structured data in different formats, each target application may register values for variable definitions registered by the source application. A transformation engine may then determine distinct sets of variable values and transform structured data based on each distinct set of variable values. In doing so, the number of transformed documents generated is limited to the number of distinct sets of variable values, thereby avoiding generating duplicate transformed documents.

When transferring structured data between a source application and service-oriented target applications that process structured data in different formats, the structured data to be transferred may be divided into different sections, where each section is processed by a respective service of the target application. In this case, each service of the target application may register values for each of the variables definitions registered by the source application. In doing so, the transformation engine may transform each section of the structured data and subsequently transfer the transformed sections of the structured data to respective services of the target application for processing.

While the foregoing is directed to embodiments of the present invention, other and further embodiments of the invention may be devised without departing from the basic scope thereof, and the scope thereof is determined by the claims that follow.

What is claimed is:

1. A computer-implemented method for transforming structured document data received from a source application for use by a target application, comprising:

receiving, from the source application, one or more variable definitions, wherein each variable definition defines a variable used to determine how to transform the structured document data, based on a specified value for each of the one or more variable definitions;

receiving, from the target application, a registered value for each of the one or more variable definitions, wherein the registered value for each of the one or more variable definitions indicates a format of the structured document data that is compatible with the target application;

receiving, from the source application, the structured document data, wherein the structured document data includes one or more embedded processing rules used to transform the structured document data, based on a value for each of the one or more variable definitions;

identifying the registered value for each of the one or more variable definitions;

applying the embedded processing rules to the structured document data, based on the registered value for each of the one or more variable definitions, to transform the structured document data to be compatible with the target application; and transmitting the transformed structured document data to the target application.

2. The computer-implemented method of claim 1, further comprising, storing the variable definitions received from the source application in a registry.

3. The computer-implemented method of claim 2, further comprising, storing the registered value for each of the one or more variable definitions received from the target application in the registry.

4. The computer-implemented method of claim 1, wherein each variable definition includes at least a source application name, a variable name, and a variable type.

5. The computer-implemented method of claim 1, wherein the structured document data comprises an extensible markup language (XML) document composed according to a document type definition (DTD).

6. The computer-implemented method of claim 5, wherein at least one of the embedded processing rules comprises an Extensible Stylesheet Language Transformation (XSLT) selectively applied to the structured document data, based on one or more of the registered values for the variable definitions.

7. The computer-implemented method of claim 1, wherein transmitting the transformed structured document data to the target application comprises transmitting the transformed structured document data to a plurality of target applications.

8. A computer-readable storage medium containing a program which, when executed, performs an operation for transforming structured document data received from a source application for use by a target application, comprising:
  receiving, from the source application, one or more variable definitions, wherein each variable definition defines a variable used to determine how to transform the structured document data;
  receiving, from the target application, a registered value for each of the one or more variable definitions, wherein the registered value for each of the one or more variable definitions indicates a format of the structured document data that is compatible with the target application;
  receiving, from the source application, the structured document data, wherein the structured document data includes one or more embedded processing rules used to transform the structured document data, based on a value for each of the one or more variable definitions;
  identifying the registered value for each of the one or more variable definitions;
  applying the embedded processing rules to the structured document data, based on the registered value for each of the one or more variable definitions, to transform the structured document data to be compatible with the target application; and
  transmitting the transformed structured document data to the target application.

9. The computer-readable storage medium of claim 8, wherein the operation further comprises:
  storing the variable definitions received from the source application in a registry.

10. The computer-readable storage medium of claim 9, further comprising, storing the registered value for each of the one or more variable definitions received from the target application in the registry.

11. The computer-readable storage medium of claim 8, wherein the structured document data comprises an extensible markup language (XML) document composed according to a document type definition (DTD).

12. The computer-readable storage medium of claim 11, wherein at least one of the embedded processing rules comprises an Extensible Stylesheet Language Transformation (XSLT) selectively applied to the structured document data, based on one or more of the registered values for the variable definitions.

13. The computer-readable storage medium of claim 8, wherein transmitting the transformed structured document data to the target application comprises transmitting the transformed structured document data to a plurality of target applications.

14. A system, comprising:
  a processor; and
  a memory containing a program, which, when executed by the processor, is configured to transform structured document data received from a source application for use by a target application by performing an operation comprising:
    receiving, from the source application, one or more variable definitions, wherein each variable definition defines a variable used to determine how to transform the structured document data;
    receiving, from the target application, a registered value for each of the one or more variable definitions, wherein the registered value for each of the one or more variable definitions indicates a format of the structured document data that is compatible with the target application;
    receiving, from the source application, the structured document data, wherein the structured document data includes one or more embedded processing rules used to transform the structured document data, based on a value for each of the one or more variable definitions;
    identifying the registered value for each of the one or more variable definitions;
    applying the embedded processing rules to the structured document data, based on the registered value for each of the one or more variable definitions, to transform the structured document data to be compatible with the target application; and
    transmitting the transformed structured document data to the target application.

15. The system of claim 14, wherein the operation further comprises storing the variable definitions received from the source application in a registry.

16. The system of claim 15, wherein the operation further comprises storing the registered value for each of the one or more variable definitions received from the target application in the registry.

17. The system of claim 14, wherein each variable definition includes at least a source application name, a variable name, and a variable type.

18. The system claim 14, wherein the structured document data comprises an extensible markup language (XML) document composed according to a document type definition (DTD).

19. The system of claim 18, wherein at least one of the embedded processing rules comprises an Extensible Stylesheet Language Transformation (XSLT) selectively applied to the structured document data, based on one or more of the registered values for the variable definitions.

20. The system of claim 14, wherein transmitting the transformed structured document data to the target application comprises transmitting the transformed structured document data to a plurality of target applications.

21. A computer-readable storage medium containing a program which, when executed, performs an operation for transforming structured document data received from a source application for use by a target application, comprising:
  receiving, from the source application, one or more variable definitions, wherein each variable definition defines a variable used to determine how to transform the structured document data, and wherein each variable definition includes at least a source application name, a variable name, and a variable type;
  receiving, from the target application, a registered value for each of the one or more variable definitions;
  receiving, from the source application, the structured document data, wherein the structured document data includes one or more embedded processing rules used to transform the structured document data, based on a value for each of the one or more variable definitions;
  identifying the registered value for each of the one or more variable definitions;
  applying the embedded processing rules to the structured document data, based on the variable definitions, to transform the structured document data to be compatible with the target application; and
  transmitting the transformed structured document data to the target application.

* * * * *